United States Patent [19]

Yoneyama

[11] 3,898,634

[45] Aug. 5, 1975

[54] MAGNETIC-WIRE MEMORY SYSTEM

[75] Inventor: Toshikazu Yoneyama, Komabayashi, Japan

[73] Assignee: Toko Kabushiki Kaisha, Japan

[22] Filed: Aug. 16, 1974

[21] Appl. No.: 498,101

Related U.S. Application Data

[63] Continuation of Ser. No. 315,466, Dec. 15, 1972, abandoned.

[30] Foreign Application Priority Data

Dec. 18, 1971 Japan .............................. 46-102285

[52] U.S. Cl. ................. 340/174 RC, 174 PW, 174, DA; 340/174 DC

[51] Int. Cl.$^2$ ........................................ G11C 11/155

[58] Field of Search... 340/174 PW, 174 RC, 174 DA, 340/174 DC

[56] References Cited

UNITED STATES PATENTS 3,533,083 10/1970 Liepa ............................ 340/174 RC Primary Examiner—James W. Moffitt
Attorney, Agent, or Firm—Fitzpatrick, Cella, Harper & Scinto

[57] ABSTRACT

A magnetic-wire memory system of a balanced, address selecting matrix type comprises a first and a second memory stack each including the same number of information lines and word lines both arranged in a symmetrical manner, a word driving circuit provided commonly for these memory stacks for driving a word line, a differential amplifier to receive output signals from these stacks, a plurality of switching circuits respectively connected to all of the information lines, and a bit driving circuit to drive two information lines included respectively in said first and second memory stacks through resistors and the corresponding switching circuits, whereby when read-out, an information signal including noise and only noise are delivered from these memory stacks to the differential amplifier, and the noises are therein cancelled.

5 Claims, 2 Drawing Figures

PRIOR ART

MAGNETIC-WIRE MEMORY SYSTEM

This is a continuation, of application Ser. No. 315,466, filed Dec. 15, 1972 and now abandoned.

BACKGROUND OF THE INVENTION

This invention relates to magnetic wire type memory systems, and more particularly to a memory system wherein nonmagnetic dummy wires employed therein for noise cancellation are replaced by magnetic wires arranged symmetrically.

Heretofore, in a balanced, address selecting matrix type, 2½D (2 and half dimensional array) type memory system wherein the selection of addresses is carried out not only from the word line side but also from the information line side has been used from an economic viewpoint. However, the conventional balanced, address selecting matrix type magnetic wire memory system utilizes nonmagnetic dummy wires, for eliminating noises, besides of the magnetic wires operable as information lines, and because of the differences in electrical characteristics of these two kinds of wires, noises created therein cannot be balanced out completely.

Furthermore, since the operational characteristics of these two kinds of lines are more significantly different in a high-frequency range than in the low-frequency range, the problem of the noise compensation becomes more difficult when the size of the memory device is enlarged and the operational speed thereof is elevated.

In addition, the conventional address selecting matrix type memory device includes asymmetric arrangement of the component circuits as will be hereinlater described, whereby the noise compensating feature of the address selecting matrix is further aggravated.

SUMMARY OF THE INVENTION

Therefore, a primary object of the present invention is to provide a magnetic wire memory system of a balanced, address selecting matrix type wherein the above described drawbacks of the conventional devices can be substantially eliminated.

Another object of the invention is to provide a magnetic wire memory system of the above described type wherein noises created in the information lines at the time of the address selection and read out can be substantially compensated for.

Still another object of the invention is to provide an improved magnetic wire memory system wherein the noise compensation can be attained satisfactorily regardless of the size of the device and the operational speed thereof.

A further object of the invention is to provide an improved magnetic wire memory system of a balanced address selecting matrix type wherein the information lines and the noise compensating lines are arranged in a symmetrical manner.

These and other objects of the present invention can be achieved by a magnetic wire memory system of a balanced address selecting matrix type comprising first and second memory stacks including the same number of information lines and word lines and being arranged in a symmetrical manner, a word driving circuit commonly provided for these memory stacks, a differential amplifier to receive output signals from these stacks, a plurality of switching circuits connected respectively to all of the information lines, and a bit driving circuit to drive, when writing in, two information lines each included in the first and second memory stacks, through resistors and two corresponding switching circuits, whereby when a word line and two information lines are selected by means of the word driving circuit and two corresponding switching circuit, an information signal containing noise is delivered from one of the information lines, while only noise is delivered from the other of the information lines, and the noises are cancelled in the differential amplifier.

The nature, principle, and utility of the present invention will be more clearly understood from the following detailed description of the invention when read in conjunction with the accompanying drawings, wherein like parts are designated by like reference numerals.

DETAILED DESCRIPTION OF THE INVENTION

Figure 1:
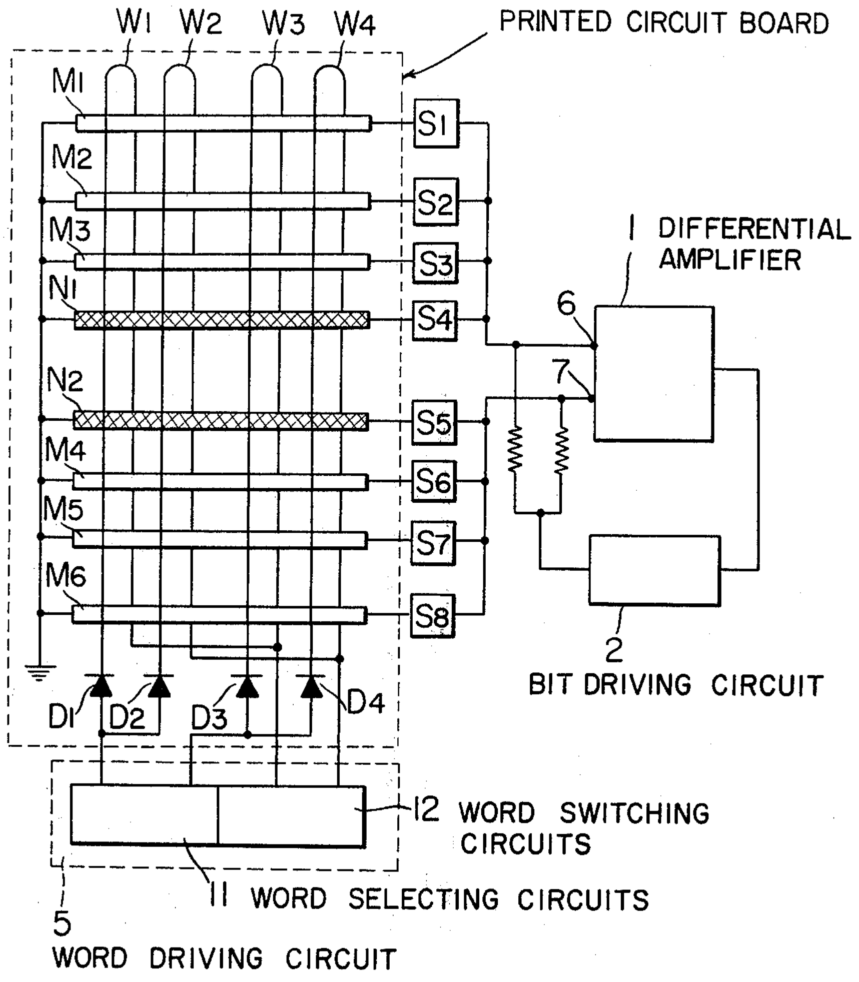
FIG. 1 is a simplified diagram illustrating a conventional magnetic wire memory system of a balanced address selecting matrix type, especially 2½D type.

As conducive to a full understanding of the present invention, a conventional magnetic wire memory system of balanced address selecting matrix type will first be described in more detail with reference to FIG. 1. In this memory system information lines $M_1$ through $M_6$ are made of magnetic wires each consisting of an electrically conductive wire plated with a thin layer of a magnetic substance. A pair of dummy wires $N_1$ and $N_2$ made of a nonmagnetic material are also provided in the memory device for compensating for noises. When, for instance, a word line $W_1$ is selected by means of a word driving circuit 5 comprising word selecting circuits generally designated by 11 and word switching circuits generally designated by 12 thereby to pass a word current in the word line $W_1$, information bits stored at the intersecting points between the information lines $M_1$ through $M_6$ and the word line $W_1$ are now prepared to be read out. In this case, however, noises are also created in the information lines $M_1$ through $M_6$ as a result of the quick establishment of the word current in the word line $W_1$.

In the dummy lines $N_1$ and $N_2$, no information signals are created because of their nonmagnetic and hence nonstoring nature, and only noise signals of an equal phase relationship with the noises introduced in the information lines $M_1$ through $M_6$ are created in the dummy lines $N_1$ and $N_2$ through stray capacities existing between these dummy lines $N_1$ and $N_2$ and the word line $W_1$.

When, for instance, bit selecting switches $S_1$ and $S_5$ connected to the information line $M_1$ and the dummy line $N_2$ are then closed by means of a bit driving circuits 2, outputs from the information line $M_1$ and the dummy line $N_2$ are received in a readout amplifier 1. Since the readout amplifier 1 is made in the form of a differential amplifier, the output signal from the information line $M_1$ is subtracted by the output from the dummy line $N_2$, so that the noises created in these lines cancel each other, and only the information signal is delivered from the amplifier 1.

Likewise, when another one of the information lines $M_4$ through $M_6$ is read out through a bit selecting switch, the output of the dummy line $N_1$ is simultaneously read out through the corresponding one of the bit selecting switches, and the noise signals caused therein cancel each other.

However, because the information lines $M_1$ through $M_6$ are made of magnetic wires, and the dummy line $N_1$ and $N_2$ are made of nonmagnetic wires, the transferring characteristics, delay times, frequency characteristics, d.c. resistances, and a.c. impedances of these two kinds of lines are all different from each other as describe before. Thus, the noise signals, which had a common mode relationship at their initiation time, are differently deformed while the noise signals travel from the initiated points to the input terminals 6 and 7 of the differential amplifier 1, and the difference components of the noise signals thus created are amplified in the differential amplifier 1. This disadvantageous feature becomes a serious problem when the size of the memory device is made greater and the lengths of the information lines and the dummy lines become longer.

Ordinarily, dummy lines made of non-magnetic material have better susceptibility than that of an information line having a magnetic plating for the higher-frequency components of noises, and for this reason, high-frequency portions of noises are exaggerated in the dummy lines rather than the information lines under the rapid establishment of the word current. Such a feature in the conventional device causes a serious disadvantage when a memory device of the conventional construction is operated at a high speed.

Furthermore, the above described unbalanced components in the noises are caused not only because of the above described reason, but also as a result of the asymmetric arrangement of these lines.

In the conventional memory device, a plurality of information lines are operated cooperatively with a single dummy line, whereby the distance from an intersecting point, between the selected information line and word line, to the readout amplifier is sometimes much longer than the distance from an intersecting point, between the dummy line and the selected word line, to the readout amplifier. Such an asymmetric arrangement of the information lines and the dummy lines causes further unbalance in the noises created in these lines.

Thus the conventional magnetic wire memory device of the balanced address selecting matrix type has possessed serious drawbacks in its high-speed operational range or when the size of the memory matrix becomes large.

This invention is directed toward overcoming the above described drawbacks of the conventional magnetic wire memory system of the balanced address selecting matrix type wherein the magnetic wires are arranged into a plurality of memory stacks of a symmetrical construction, and the magnetic wires are used alternately as an information line and a dummy line for compensating for noises.

Figure 2:
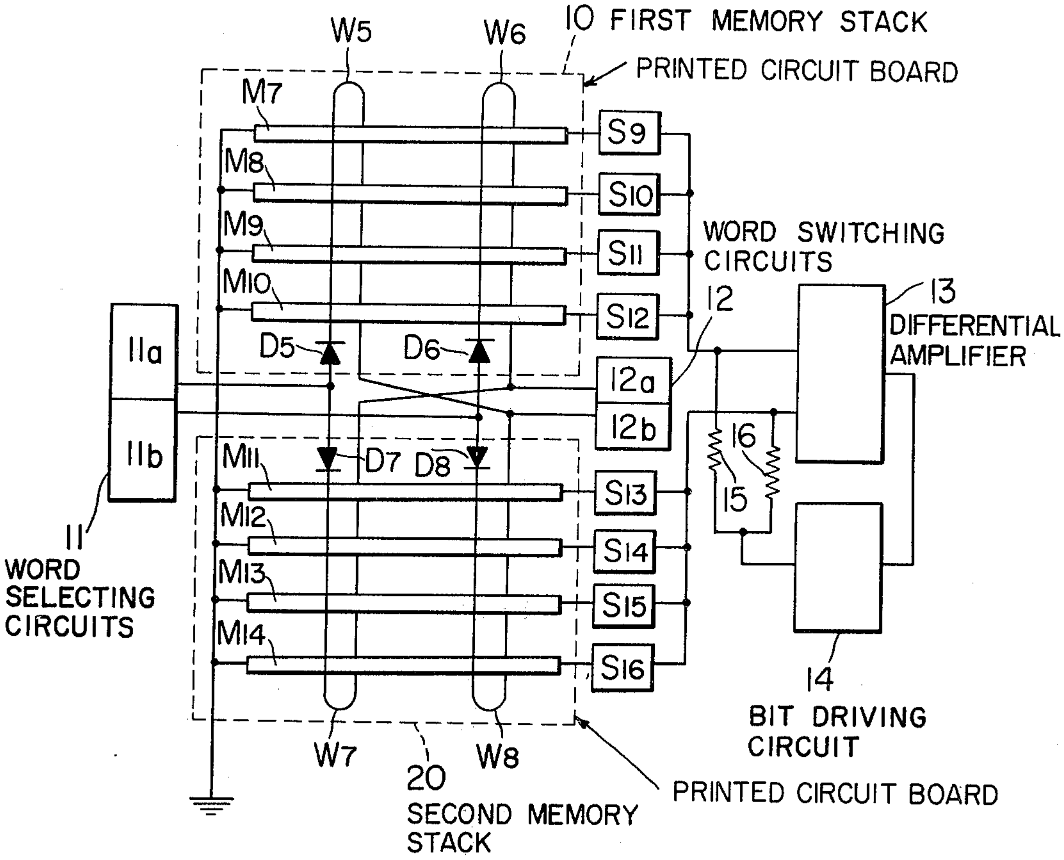
FIG. 2 is a simplified diagram of a magnetic wire type memory system according to the present invention.

Referring now to FIG. 2 showing, in a much simplified manner, an example of magnetic wire type memory device according to the present invention, the memory device comprises a first memory stack 10 including magnetic wires $M_7$ through $M_{10}$, and a second memory stack 20 including magnetic wires $M_{11}$ through $M_{14}$. Word lines representatively indicated by reference charactors $W_5$, $W_6$, $W_7$, and $W_8$ are provided and connected with diodes $D_5$, $D_6$, $D_7$, and $D_8$ as shown in the drawing. The first memory stack 10, word lines $W_5$ and $W_6$, and diodes $D_5$ and $D_6$ constitute a first diode matrix, and the second memory stack 20, word lines $W_7$ and $W_8$, and diodes $D_7$ and $D_8$ constitute a second diode matrix having a memorizing capacity similar to that of the first diode matrix.

In this example, the word driving circuit comprises word selecting circuits generally designated by 11 and word switching circuits generally designated by 12, which are shown, for the purpose of simplification, as two word selecting circuits $11_a$ and $11_b$ and two word switching circuits $12_a$ and $12_b$. The word selecting circuits $11_a$ and $11_b$ are connected to the junction point of the word lines $W_5$ and $W_7$, and to the junction point of the word lines $W_6$ and $W_8$, respectively.

Likewise, word switching circuits $12_a$ and $12_b$ are connected to the junction points of the word lines $W_6$ and $W_7$, and to the junction point of the word lines $W_5$ and $W_8$, respectively.

Bit selecting switches $S_9$ through $S_{16}$ are connected to the magnetic wires $M_7$ through $M_{14}$. A differential amplifier 13 is commonly provided on the delivery side terminals of the memory stacks 10 and 20. A bit driving circuit 14 is connected through resistors 15 and 16 to the bit selecting switches $S_9$ through $S_{16}$, as shown in FIG. 2, for driving the bit selecting switches $S_9$ through $S_{16}$ from the bit side of the address selecting matrix.

In the specific example of FIG. 2, if a word selecting circuit $11_a$ and a word switching circuit $12_b$ operated, a word line $W_5$ is selectively energized in the first memory stack 10, and information signals and noise signals are produced in the magnetic wires $M_7$ through $M_{10}$. However, the word line $W_7$ is not energized because of the nonoperation of the word switching circuit $12_a$, and a potential variation caused in the word selecting circuit $11_a$ at the time of the energization is conveyed to the word line $W_7$, thereby producing only noise signals in the magnetic wires $M_{11}$ through $M_{14}$.

Likewise, if a word selecting circuit $11_b$ and a word switching circuit $12_a$ are operated, a word line $W_6$ is energized selectively in the first memory stack 10, producing information signals and noise signals in the magnetic wires $M_7$ through $M_{10}$, but producing mere noise signals in the magnetic wires $M_{11}$ through $M_{14}$.

For this reason, if the bit selecting switches $S_9$ and $S_{16}$, arranged at symmetrical positions, are closed, the information signal and noise signal in the magnetic wire $M_7$, and only the noise signal in the magnetic wire $M_{14}$ are delivered to the differential amplifier 13. Since the noise signals in these magnetic wires $M_7$ and $M_{14}$ have a common mode relationship, the noise signals nullify each other, and only the information signal is read out from the differential amplifier 13. In this case, the magnetic wire $M_7$ operates as an information line, and the magnetic wire $M_{14}$ operates as a dummy line.

Conversely, when the word selecting circuit $11_a$ and the word switching circuit $12_a$ are energized, or when the word selecting circuit $11_b$ and the word switching circuit $12_b$ are energized, information signals in the magnetic wires $M_{11}$ through $M_{14}$ in the second memory stack 20 can be read out from the amplifier 13 without the noises which are cancelled out between two symmetrically arranged magnetic wires. In this case, for instance, the magnetic wire $M_{14}$ is employed as an information line, and the magnetic wire $M_7$ is employed as a dummy line.

As described above, according to the present invention, the dummy lines in the conventional memory devices are replaced by magnetic wires, whereby the possibility of unbalance between the noises caused in these wires owing to the difference in the transmission characteristics of these wires is completely eliminated.

Furthermore, the bit selecting switches $S_9$ through $S_{16}$ are operated in a symmetrical manner by means of the driving circuit (not shown) for driving bit selecting switches, and the information and noise compensating magnetic wires selected by these bit selecting switches are symmetrically arranged with respect to the word lines, as described above, whereby any unbalance in the noises caused by the asymmetrical arrangements of these wires can be substantially eliminated.

Although the invention has been described with respect to a simplified example thereof, the memory device may include a number of pairs of the memory stacks, and these memory stacks may be arranged on a printed circuit board in such a manner that one stack in each pair of these pairs is placed on the front surface of the printed circuit board and the other stack in the pair is placed on the rear side surface thereof at the just opposite position. In this case, the word selecting and switching circuits 11, 12, the differential amplifier 13, and the bit driving circuit 14 may be provided commonly for each pair of these memory stacks arranged on the front surface and the rear surface of the printed circuit board, and a memory device of a far larger size can be easily organized when these memory stacks are connected in series.

In another example, a plurality of printed circuit boards having the first memory stack and the second memory stack on the front and rear surfaces thereof may be connected so as successively connect the corresponding information lines of a plurality of boards in series thereby to select only one word line from the memory stacks by the combination of the word driving circuit and the word switching circuit.

I claim:

1. A magnetic-wire memory system of a balanced, address selecting matrix tape which comprises a first memory stack and a second memory stack each including an equal number of magnetic lines and each including an equal number of word lines, and arranged in a symmetrical manner, a word driving circuit comprising word selecting circuits and word switching circuits commonly provided for these stacks in a manner such that operation of one word selecting circuit causes a potential variation in a selected word line of each stack while simultaneous operation of one word switching circuit energizes the selected word line of only one stack, a differential amplifier having inputs connected to receive output signals from the magnetic lines of a different one of these stacks, a plurality of bit selecting switching circuits connected respectively to all of the information lines, resistor means, and a bit driving circuit arranged to drive two magnetic lines symmetrically through said resistor means and corresponding bit selecting switching circuits, whereby when one aligning word line and two magnetic lines are selected by the word driving circuit and the corresponding switching circuits, information signals including noises are delivered from one of the magnetic wires while only noises are delivered from the other magnetic wire, and the noises cancel each other in the differential amplifier.

2. A system as set forth in claim 1 wherein said switching circuits are so controlled that two magnetic wires arranged symmetrically with respect to the differential amplifier are selected in said first and second memory stacks.

3. A system as set forth in claim 1 wherein said word driving circuit comprises word selecting circuits and word switching circuits, the same number of word lines in said first and second memory stacks being connected respectively to both the word selecting circuits and the word switching circuits, and each of the word selecting circuits and the word switching circuits being so combined that only one word line in the first memory stack or in the second memory stack is thereby energized.

4. A system in claim 1 wherein said first memory stack and second memory stack are arranged symmetrically on the front and rear surfaces of a printed circuit board.

5. A system as set forth in claim 4 wherein a plurality of said printed circuit board, having the first memory stack and the second memory stack arranged on the front and rear surfaces thereof, are connected successively in series.

* * * * *